(12) United States Patent
Grace et al.

(10) Patent No.: US 11,206,943 B2
(45) Date of Patent: Dec. 28, 2021

(54) HIGH-TEMPERATURE LINER FOR COOKING DEVICES

(71) Applicants: John A. Grace, Covington, LA (US); Timothy M. Bramer, San Ramon, CA (US)

(72) Inventors: John A. Grace, Covington, LA (US); Timothy M. Bramer, San Ramon, CA (US)

( * ) Notice: Subject to any disclaimer, the term of this patent is extended or adjusted under 35 U.S.C. 154(b) by 163 days.

(21) Appl. No.: 15/880,984

(22) Filed: Jan. 26, 2018

(65) Prior Publication Data

US 2018/0206672 A1 Jul. 26, 2018

Related U.S. Application Data

(60) Provisional application No. 62/482,053, filed on Apr. 5, 2017, provisional application No. 62/451,016, filed on Jan. 26, 2017.

(51) Int. Cl.
*A47J 36/16* (2006.01)
*A47J 45/06* (2006.01)
*A47J 36/04* (2006.01)

(52) U.S. Cl.
CPC ............. *A47J 36/16* (2013.01); *A47J 36/04* (2013.01); *A47J 45/068* (2013.01); *A47J 2202/00* (2013.01)

(58) Field of Classification Search
CPC .......... A47J 36/16; A47J 36/04; A47J 45/068; A47J 2202/00; A47J 37/108
See application file for complete search history.

(56) References Cited

U.S. PATENT DOCUMENTS

| | | | | | |
|---|---|---|---|---|---|
| 1,356,432 | A | * | 10/1920 | Eidt | A47J 37/108 99/418 |
| 1,468,841 | A | * | 9/1923 | Smith | A47J 27/10 126/377.1 |
| 2,332,117 | A | * | 10/1943 | Shepherd | A47J 37/108 99/355 |
| 2,411,345 | A | * | 11/1946 | Suttles | A47J 37/108 99/349 |
| 2,513,839 | A | * | 7/1950 | Barnes | A47J 37/108 99/349 |
| 2,544,846 | A | * | 3/1951 | Mach | A47J 37/108 99/355 |
| 2,659,362 | A | * | 11/1953 | Strehl | A47J 36/16 126/390.1 |
| 3,427,957 | A | * | 2/1969 | O'Reilly | A47J 37/108 99/446 |
| 3,603,767 | A | * | 9/1971 | Scicchitano | A47J 27/10 219/439 |

(Continued)

*Primary Examiner* — Jason L Vaughan
(74) *Attorney, Agent, or Firm* — Workman Nydegger

(57) ABSTRACT

Embodiments are directed to a cooking device and/or to a high-temperature liner, potentially made out of silicone. In one scenario, the high-temperature liner includes a liner shell configured for placement within a cavity of a cooking device, a bottom plate embedded within the liner shell, and a temperature gauge configured to provide internal temperature readings for the cooking device. The cooking device may be formed of a laminate structure, wherein one or more layers of the laminate structure include a temperature gauge, a thermoelectric generator, and or a controller.

19 Claims, 7 Drawing Sheets

(56) References Cited

U.S. PATENT DOCUMENTS

| | | | | |
|---|---|---|---|---|
| 3,724,711 | A * | 4/1973 | George | A47J 37/10 220/573.1 |
| 3,908,534 | A * | 9/1975 | Martin | A47J 37/108 99/418 |
| 3,946,893 | A * | 3/1976 | Bowersmith | A21B 3/13 220/573.4 |
| 4,373,511 | A * | 2/1983 | Miles | A47J 27/04 126/369 |
| 4,397,298 | A * | 8/1983 | Abell | A47J 27/04 126/369 |
| 4,940,635 | A * | 7/1990 | Andrieu | A47J 36/04 428/408 |
| 5,323,693 | A * | 6/1994 | Collard | A47J 37/108 99/415 |
| 5,441,344 | A * | 8/1995 | Cook, III | A47J 43/28 374/141 |
| 5,643,485 | A * | 7/1997 | Potter | A47J 27/002 219/621 |
| 5,934,181 | A * | 8/1999 | Adamczewski | A47J 45/068 99/342 |
| 6,182,557 | B1 * | 2/2001 | Wilk | A47J 37/108 426/523 |
| 6,578,469 | B2 * | 6/2003 | Sharpe | A47J 37/10 374/141 |
| 6,848,355 | B2 * | 2/2005 | Cesare | A47J 45/068 16/110.1 |
| 6,860,192 | B2 * | 3/2005 | Sharpe | A47J 37/10 374/141 |
| 7,112,765 | B2 * | 9/2006 | Dall'Asta | A47J 45/068 219/240 |
| 7,157,675 | B2 * | 1/2007 | Imura | A47J 27/62 219/627 |
| 7,377,208 | B2 * | 5/2008 | Ho | A47J 45/068 374/141 |
| 7,484,456 | B2 * | 2/2009 | Ferron | G01K 11/12 99/342 |
| 7,487,882 | B2 * | 2/2009 | Ferron | A47J 45/068 220/573.1 |
| 7,754,261 | B2 * | 7/2010 | Stewart | A47J 43/18 426/300 |
| 8,637,797 | B2 * | 1/2014 | Imura | A47J 27/62 219/627 |
| 8,783,947 | B2 * | 7/2014 | Ferron | A47J 45/068 374/141 |
| 9,648,975 | B2 * | 5/2017 | Imura | A47J 27/62 |
| 10,012,549 | B2 * | 7/2018 | Mitchell | G01K 1/024 |
| 10,193,050 | B2 * | 1/2019 | Compeau | A47J 36/06 |
| 10,499,759 | B2 * | 12/2019 | Cheng | A47J 45/061 |
| 2001/0032546 | A1 * | 10/2001 | Sharpe | A47J 37/10 99/331 |
| 2003/0169801 | A1 * | 9/2003 | Chilton | A47J 27/00 374/142 |
| 2003/0209153 | A1 * | 11/2003 | Sharpe | A47J 37/10 99/342 |
| 2004/0016348 | A1 * | 1/2004 | Sharpe | A47J 37/10 99/331 |
| 2004/0163548 | A1 * | 8/2004 | Pacenti | A47J 45/068 99/403 |
| 2004/0184511 | A1 * | 9/2004 | Kwon | A47J 45/068 374/208 |
| 2005/0103209 | A1 * | 5/2005 | Ferron | A47J 45/068 99/422 |
| 2005/0173408 | A1 * | 8/2005 | Dall'Asta | A47J 45/068 219/497 |
| 2005/0242086 | A1 * | 11/2005 | Imura | A47J 27/62 219/627 |
| 2006/0086258 | A1 * | 4/2006 | Sharpe | A47J 37/10 99/331 |
| 2006/0225502 | A1 * | 10/2006 | Ferron | A47J 45/068 73/322 |
| 2007/0012199 | A1 * | 1/2007 | Ho | A47J 45/068 99/422 |
| 2007/0095215 | A1 * | 5/2007 | Ho | A47J 45/068 99/342 |
| 2007/0257028 | A1 * | 11/2007 | Imura | A47J 27/62 219/627 |
| 2009/0152276 | A1 * | 6/2009 | Groll | A47J 36/04 220/573.4 |
| 2010/0269709 | A1 * | 10/2010 | Abed | A47J 36/06 99/340 |
| 2011/0268153 | A1 * | 11/2011 | He | A47J 37/108 374/179 |
| 2012/0031918 | A1 * | 2/2012 | Gotsis | A47J 27/002 220/752 |
| 2013/0043254 | A1 * | 2/2013 | Haworth | A47J 36/04 220/573.2 |
| 2013/0161343 | A1 * | 6/2013 | Ferron | A47J 45/068 220/756 |
| 2014/0182460 | A1 * | 7/2014 | Imura | A47J 27/62 99/342 |
| 2015/0099078 | A1 * | 4/2015 | Fish | B29C 70/462 428/36.4 |
| 2015/0208845 | A1 * | 7/2015 | Robbins | A47J 45/068 206/459.1 |
| 2015/0208858 | A1 * | 7/2015 | Robbins | A47J 45/068 426/231 |
| 2016/0069853 | A1 * | 3/2016 | Mitchell | A47J 36/00 374/142 |
| 2016/0183729 | A1 * | 6/2016 | Monk | A47J 37/108 99/349 |
| 2017/0231415 | A1 * | 8/2017 | Cheng | H05B 6/062 374/141 |
| 2017/0244020 | A1 * | 8/2017 | Compeau | A47J 36/06 |
| 2017/0354293 | A1 * | 12/2017 | Voyles | A47J 36/16 |

* cited by examiner

HIGH-TEMPERATURE LINER FOR COOKING DEVICES

CROSS-REFERENCE TO RELATED APPLICATIONS

This application claims the benefit of U.S. Provisional application 62/451,016 filed on Jan. 26, 2017 and U.S. Provisional application 62/482,053 filed on Apr. 5, 2017, which applications are incorporated by reference in their entirety.

BACKGROUND

Dutch ovens and other types of cast iron cooking devices have long been used to prepare food. Whether over a fire or charcoal, these cast iron cooking devices provide an optimal environment for cooking a wide variety of different meals. That said, however, cooking conditions may vary greatly based on how hot the fire is or where the charcoal are placed in relation to the cookware. Chefs must cook the food based on their relative experience with the process, and not based on any empirical data showing the temperature of the fire, the coals or the interior space of the cooking device.

BRIEF SUMMARY

Embodiments of the invention described herein are directed to a high-temperature liner, potentially made out of silicone. In one embodiment, the high-temperature liner may include one or more of a liner shell configured for placement within a cavity of a cooking device, a bottom plate embedded within the liner shell, and a temperature gauge configured to provide internal temperature readings for the cooking device.

In another example, embodiments of the invention are directed to a cooking device that includes an embedded temperature gauge.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to a high-temperature liner, potentially made out of silicone. In one embodiment, the high-temperature liner includes a liner shell configured for placement within a cavity of a cooking device, a bottom plate embedded within the liner shell, and a temperature gauge configured to provide internal temperature readings for the cooking device.

The liner shell may be made out of a variety of different materials that are capable of tolerating a high level of heat. For instance, in one embodiment, the liner shell is made of silicone. The silicone liner shell can be heated to a substantially high temperature and maintain its form. The liner shell itself may take a variety of different forms. The shell may be formed for a Dutch oven, for a frying pan, for a pot, for a grill tray or any other type of cooking device or for another device in which a temperature measurement may be performed. In particular, the liner shell may be formed and designed for cast iron cooking devices often used for camping and outdoor cooking. The shell may be substantially rigid, or may be flexible, at least in parts.

In one example, the liner shell may be shaped to fit in an interior space of the cooking device. Alternatively, the liner shell may adapt to the shape of the cooking device. For example, the liner shell may have a portion that is more rigid than other portions. This portion may be a boundary between a bottom of the liner shell and sides of the liner shell. This allows the liner shell to fit inside the cooking device. Alternatively, a portion of the liner shell (e.g., a boundary between the bottom and side of the liner shell) may be thicker (or thinner) than the bottom and side(s) of the liner shell.

Figure 1:
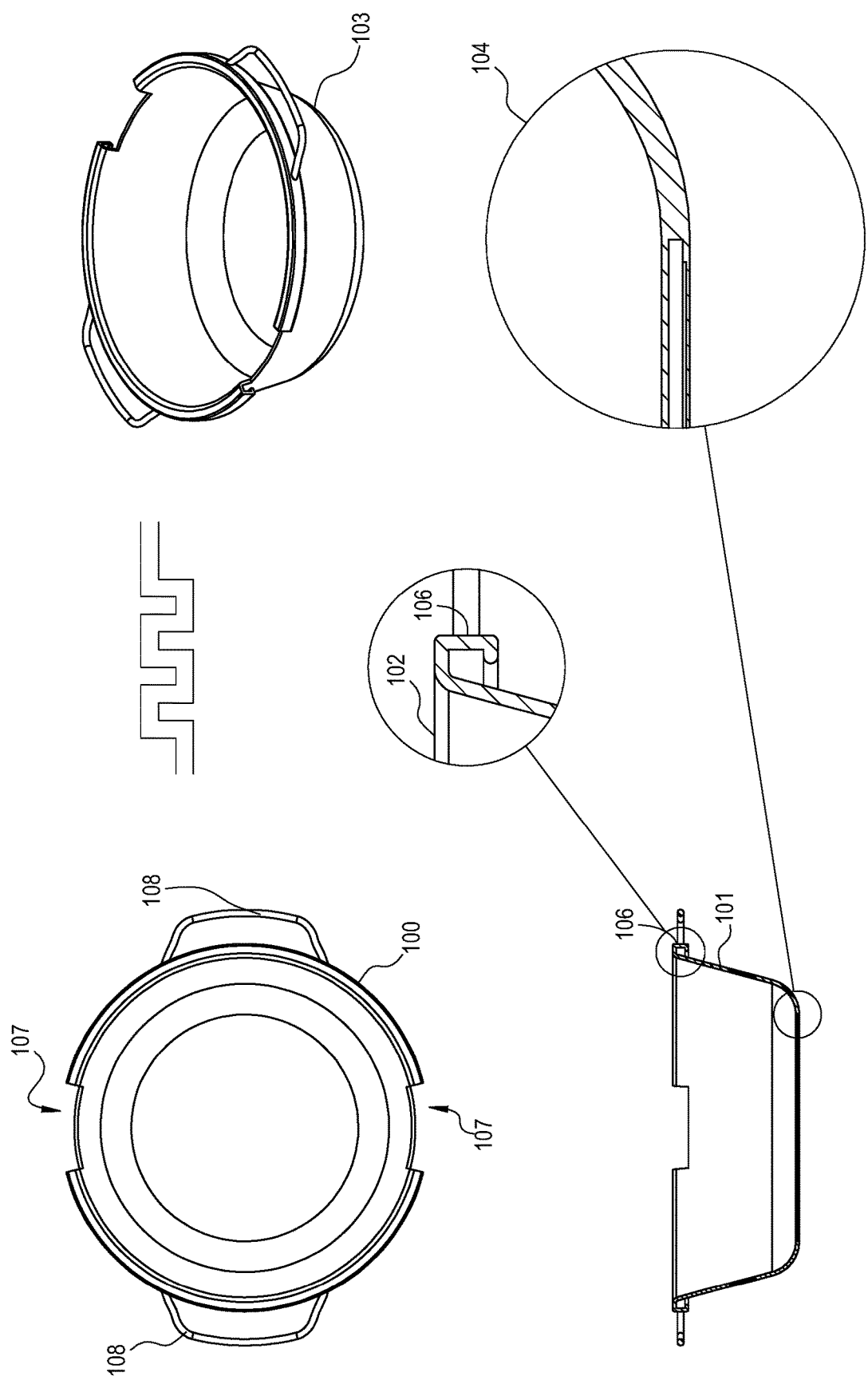
FIG. 1 illustrates example embodiments of a high-temperature liner shell and bottom plate.

As shown in FIG. 1, drawing 101 shows a side view of the liner shell and also shows a cross section of the liner shell. The shell may include a lip 106 near the top that holds the shell in place when it is positioned in the cavity of a cooking device. The lip 106 may be shaped to engage with the edge of the cooking device. The lip 106 may wrap around the top edge of the cooking device. In one example, the lip 106 may wrap around and contact the outer surface of the cooking device. The lip 106 may be formed with sufficient rigidity to prevent the liner shell from falling into the cooking device. A metal (or other material) may be embedded in the lip 106 such that the lip 106 engages with the cooking device and such that the liner shell's position with respect to the cooking device is maintained during use.

The liner shell may include cutouts 107 along the perimeter of the lip 106. The liner shell may have one or more cutouts. The cutouts may accommodate cooking utensils or the like. The liner shell may also have a spout to facilitate pouring in one embodiment. In one embodiment, the liner shell may also include one or more handles 108. The handles 108 can facilitate removal of the liner shell from the cooking device. The attachment points of the handle to the body of the liner shell may vary. The handles 108 may be configured to fall against the outer surface of the cooking device during use or may be more rigid.

Drawing 100 shows a top view of the liner shell which is circular in shape. It will be understood, of course, that the liner may be molded or formed into almost any shape or design. It will be similarly understood that, although the drawings of FIG. 1 illustrate a Dutch oven liner shell, the shell may be formed for different cooking or other devices. Drawing 102 illustrates a close-up cross-sectional view of the lip 106 that is disposed at or near the top of the liner shell. The lip may wrap around to form an edge that can be handled by a user, and also provides rigidity and support for the liner shell. The lip may also be sized and configured to accommodate a lid of the cooking device. Further, the lip may provide a seal for the lid of the cooking device.

Drawing 103 of FIG. 1 shows a perspective view of the liner shell. As also shown in drawings 100 and 101, the liner shell in drawing 103 may have cutouts or gaps in the lip at the top of the shell. These cutouts may allow for certain types of positioning relative to features of the cooking devices. For example, a cooking device such as a Dutch oven may have a handle for picking up and moving the cooking device. The cutouts in the liner shell may allow movement and use of the Dutch oven handle. The cutouts may also accommodate handles extending from the sides of the cooking device.

Drawing 104 of FIG. 1 illustrates a portion of a sear plate, also referred to herein as a bottom plate. The bottom plate may be made of metal and may include additional elements such as temperature gauges and thermoelectric generators. Alternatively, temperature gauges and thermoelectric generators may be embedded in the liner shell at different locations and separately from the bottom plate. In one embodiment, the liner shell may include only temperature gauges and/or thermoelectric generators without a bottom plate.

The bottom plate provides rigidity to the bottom of the liner shell. The lip may ensure that the side or sides of the liner shell remain flat against the side or sides of the cooking device during use. The lip of the liner shell may prevent the liner shell from collapsing inside the cooking device. The bottom plate may have a thickness sufficient to withstand heat and to make it difficult for the bottom plate to be bent inadvertently. The bottom plate may also have a structure that provides strength. At least a portion of the bottom plate may have a cross section that is illustrated as cross section 109.

Figure 2:
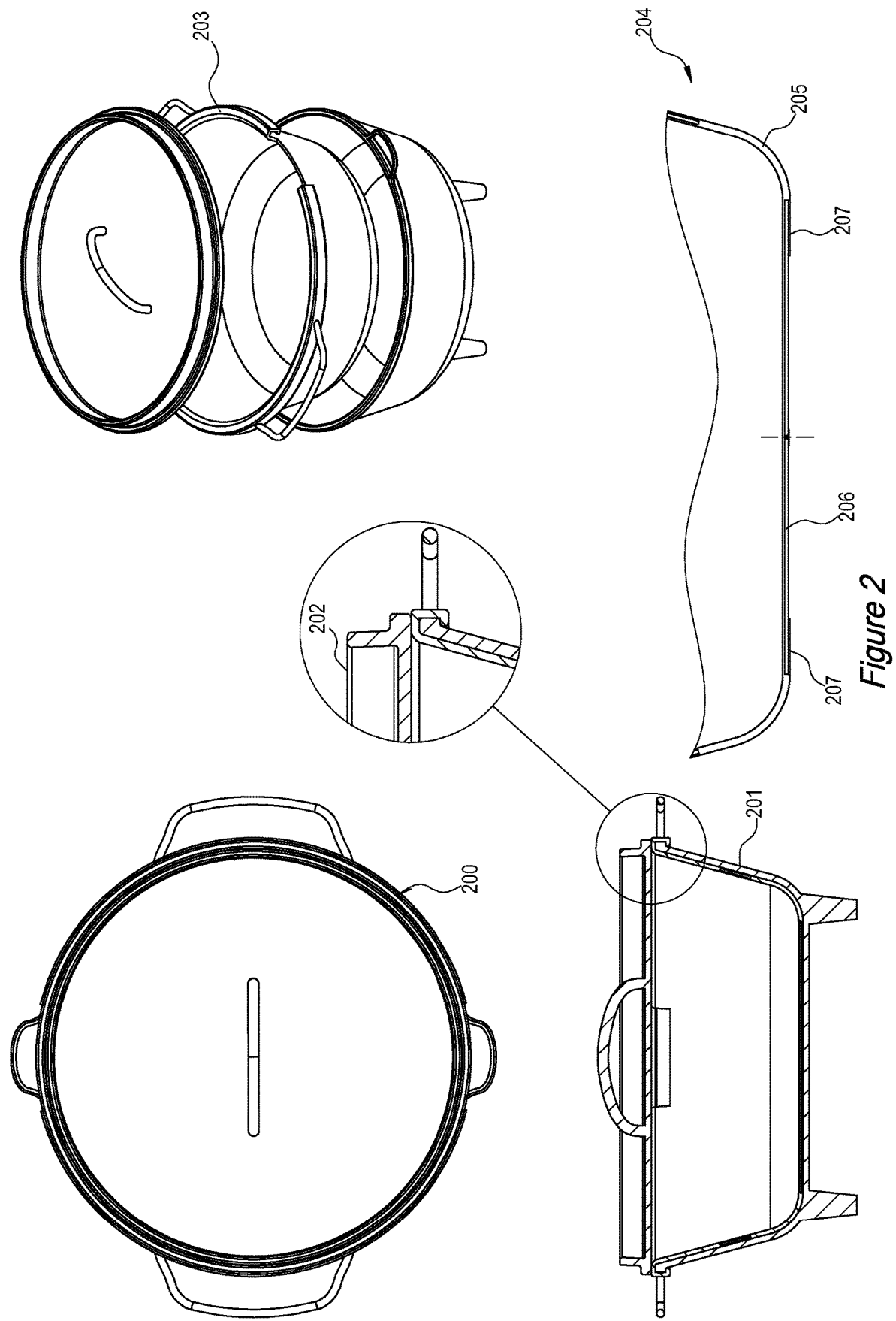
FIG. 2 illustrates example embodiments of the high-temperature liner shell when placed within the cavity of a cooking device.

As shown in FIG. 2, drawing 201 indicates that the bottom plate may be placed at the bottom of the liner shell, which itself is attached to, inserted in, or is part of the cooking device. The bottom plate may be completely embedded within the liner shell. The bottom plate may be partially exposed in another embodiment. In another embodiment, the bottom plate may be removable. A removable bottom plate can be cleaned more easily. The edges 207 can be drawn back or stretched to allow removal of the bottom plate. A removable bottom plate is illustrated in drawing 204. In drawing 204, the bottom plate 206 may come into contact with a bottom surface of the cooking device. Alternatively, the liner shell may be configured such that the exposed bottom plate is separated from the bottom of the cooking device by the body of the liner shell. This example provides a metal cooking surface. In one example, the liner shell may be part of a kit that includes bottom plates of different materials. A kit may include a steel bottom plate and a copper bottom plate. The cross-sectional view of drawing 201 shows that the bottom plate extends substantially from one foot of the Dutch oven to the other foot. The bottom plate may substantially cover the bottom surface of the cooking device. Thus, the liner shell may come in multiple sizes in order to accommodate the various sized of cooking devices. However, the same liner shell can be used with different cooking devices and the bottom plate may have a size that is smaller than the bottom surface of the cooking device. One will recognize, of course that the bottom plate may be longer or shorter than shown (i.e. have a larger or smaller radius), and may, in some cases, extend up the sides of the liner shell. In this example, the bottom plate may be shaped like a bowl rather than flat and may be completely encased in the liner shell or partially exposed.

In still other cases, the liner shell may include multiple bottom plates. These bottom plates may be positioned throughout the liner shell, and may be shaped and sized the same or differently. Thus, the liner shell may have a larger single plate, and/or multiple smaller plates. Each bottom plate may include a temperature gauge and/or a thermoelectric generator.

The temperature gauge may be made out of a variety of different materials and, in some cases, is a solid state temperature gauge. The temperature gauge may include electronic or mechanical sensors for detecting the temperature. The temperature gauges may be configured to detect the temperature of the internal air compartment, and/or temperatures of the cast iron bottom and/or side surfaces. Thus, a plurality of temperature gauges placed in different locations may detect different temperatures within the system. The temperature gauge (or gauges) thus provides an indication of a temperature of a cooking surface of the cooking device and/or a temperature of an interior space temperature. The temperature gauge may be laminated and integrated into substantially any type of cookware product (not just cast iron cooking devices), and may provide direct temperature readings for the cookware surface in those devices. The temperature gauge may also be completely or partially embedded in the body of the liner shell.

Figure 3:
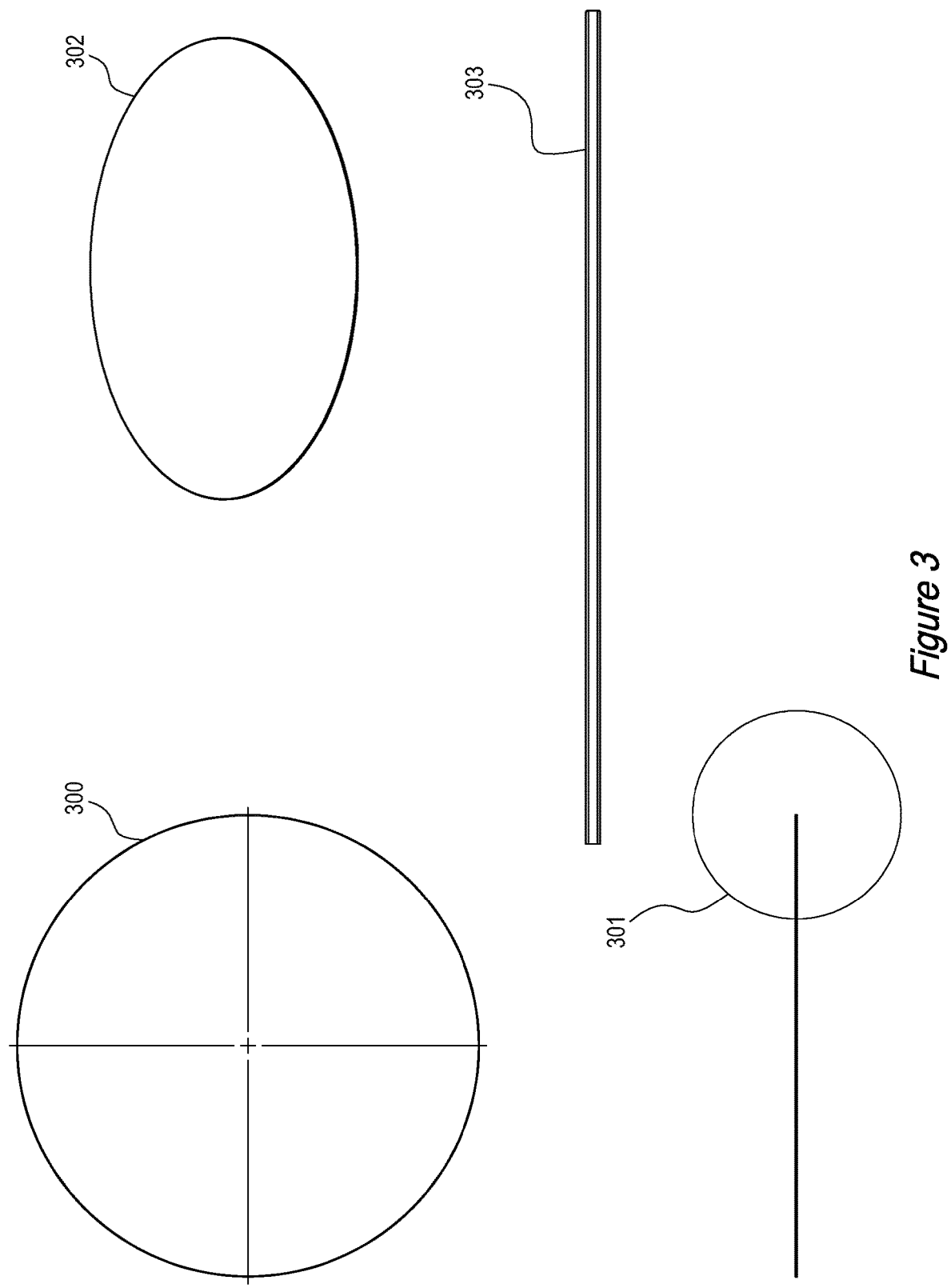
FIG. 3 illustrates various views of a bottom plate.

Drawing 200 of FIG. 2 illustrates a top view of the liner shell when placed within a cooking device such as a Dutch oven. Drawing 202 shows how the lid of the Dutch oven aligns on top of the liner shell to form a tight seal. This prevents heat and moisture from escaping the interior cooking cavity. Drawing 203 shows how the liner shell fits over the Dutch oven, after which the lid may be placed on the liner shell. FIG. 3 shows top, side and perspective views of the sear plate (in 300, 301, 302 and 303). As indicated above, the sear plate may take any shape or size, and may be used in singular or in multiple.

The liner shell may also include a thermoelectric generator. The thermoelectric generator may be embedded between two or more layers of the liner shell (as shown in drawings 104 and 303). Thus, the body of the liner shell may have multiple layers. The layers may of the same or different materials.

In some cases, the thermoelectric generator is integrated into or is part of the bottom plate (or one of the bottom plates). The thermoelectric generator is configured to power one or more electronic components that may be included in the liner shell. Indeed, the thermoelectric generator may generate enough electricity from the heat of the fire or other heat source that it can power the one or more electronic components. In one embodiment, the thermoelectric generator powers a transceiver. The transceiver may capable of connecting with a computing device such as a mobile phone, tablet, laptop, PC, wearable device or other type of computing system. The transceiver may transmit information to the electronic device including temperature readings. The thermoelectric generator can be connected to temperature sensors of gauges placed at one or more locations inside the liner shell.

The transceiver may be configured to transmit electronic temperature readings to the computing device via a wired or wireless connection. Thus, in one application, a user may insert the liner shell into a Dutch oven and begin cooking food. As the Dutch oven and the liner heat up, the thermoelectric generator, which is connected with a temperature gauge and that may include circuitry to read the temperature, may begin to generate electricity that powers the transceiver. The transceiver can then transmit temperature data as it is received from the one or more temperature gauges in the liner shell. The user may receive this data on his or her mobile phone and may then be able to make adjustments to the Dutch oven or the heat source affecting the cooking device if the temperature or temperatures are deemed to be too hot or too cool. Accordingly, using such an embodiment, a user may be continually aware of the temperature inside of the Dutch oven or other cooking device. This allows the user to have much greater control over the cooking process. Moreover, if different sensors or gauges are used in different parts of the cooking device (e.g. on different sear plates), the user will be aware of uneven heating and can take steps to remedy the situation.

The liner shell may not only provide heating and temperature data, but may also provide an advanced surface for cooking food. Due to its composition, the liner shell may also be easier to clean than traditional cast iron surfaces. The liner shell may be form-fit or custom-sized to fit third-party cast iron or other types of cookware products.

Accordingly, embodiments are described herein which include a high-temperature liner for use in cooking devices. The liner may also be applied in other high-heat situations and environments. The thermoelectric generator embedded in the liner shell generates electricity which may be used to power a variety of different electronic devices or components. These electronic devices and components may, in turn, be programmed to perform a variety of different functions and provide (via wired or wireless transmission) various types of data that can be used as feedback to improve processes including cooking.

The thermoelectric generator may include a semiconductor components that are configured to generate electricity when there is a thermal difference. For example, one side of the thermoelectric generator may be placed to face or be in contact with the bottom surface of the cooking device. The other side may face away from the bottom surface of the cooking device. In one example, the bottom plate may include multiple layers. Some of the layers may comprise the thermoelectric generator. The thermoelectric generator may include n-doped and p-doped semiconductors that can accommodate cooking conditions. The load (e.g., the temperature sensors or gauges, and transceiver, and simple controller) may be powered by the electricity generated by the thermoelectric generator.

Figure 4:
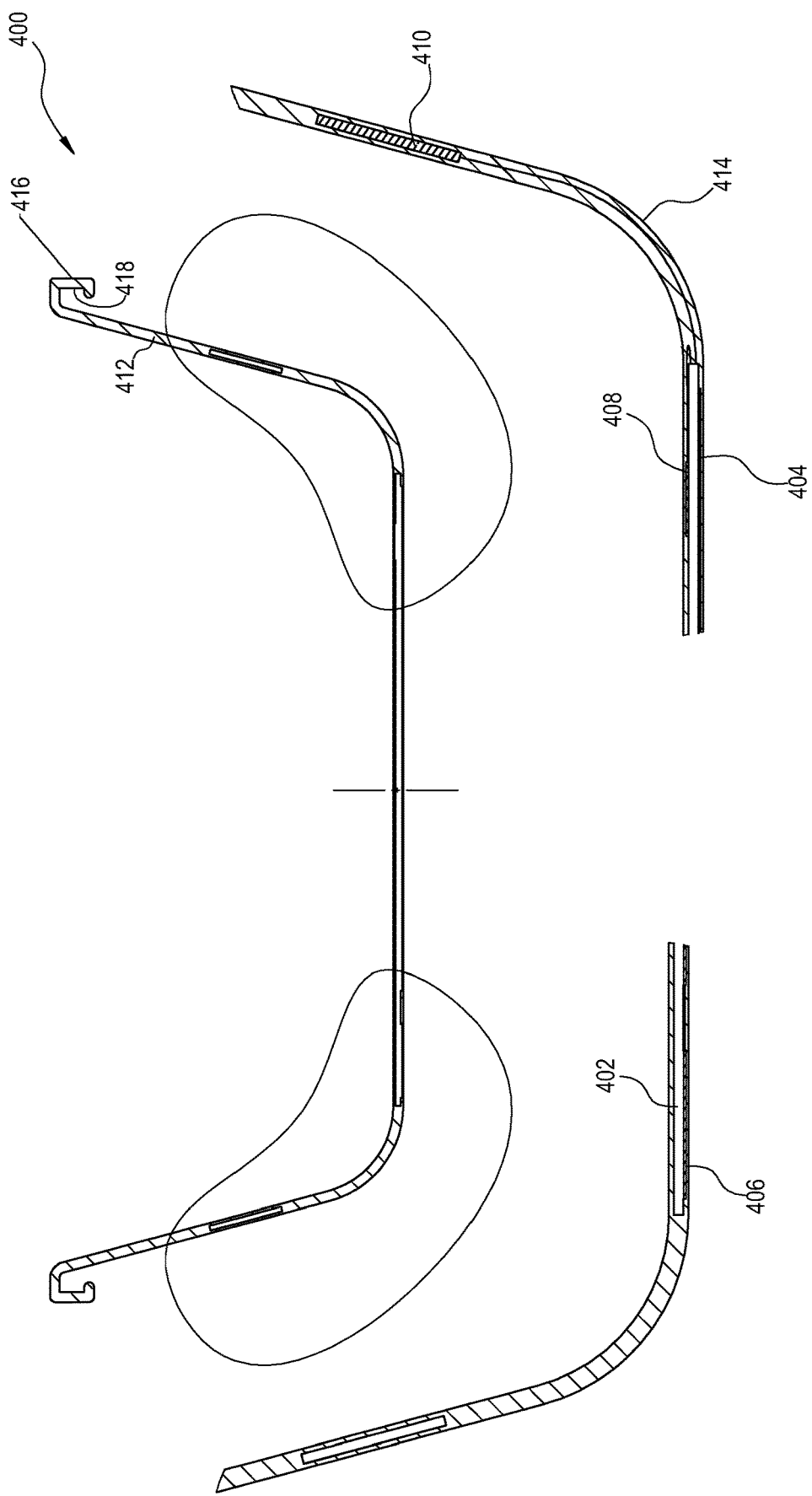
FIG. 4 illustrates a cross sectional view of a liner shell.

FIG. 4 illustrates an example of a liner shell 400. This example includes a body 412. In the liner shell 400, a bottom plate 402 is embedded in a bottom of the liner shell 400. A thermoelectric generator 404 is attached to or is part of the bottom plate 402. The thermoelectric generator is connected to temperature sensors 406, 408, and 410. These are an example of placements for temperature sensors and sensors can be placed in other locations. The sensors 406, 408, and 410 sense the temperature at different locations: beneath the bottom plate 402, above the bottom plate 402 and at a side of the cooking device. The thermoelectric generator 404 may also include a transceiver and a controller sufficient to acquire temperature values from the sensors and transmit the sensors to an external device.

In one example, the junction 414 between the side or sides of the liner shell and the bottom of the liner shell may be shaped to accommodate a cooking device. The junction 414 may be less flexible than other portions of the liner shell such as the sides. The lip 416 may include a gripping portion 418. The gripping portion 418 may include a coating that allows the liner to grip a surface of the cooking device. Alternatively, the shape of the lip and strength of the lip may hold the liner in place when placed in or on a cooking device. The liner is configured to be removable and cleanable.

Figure 5:
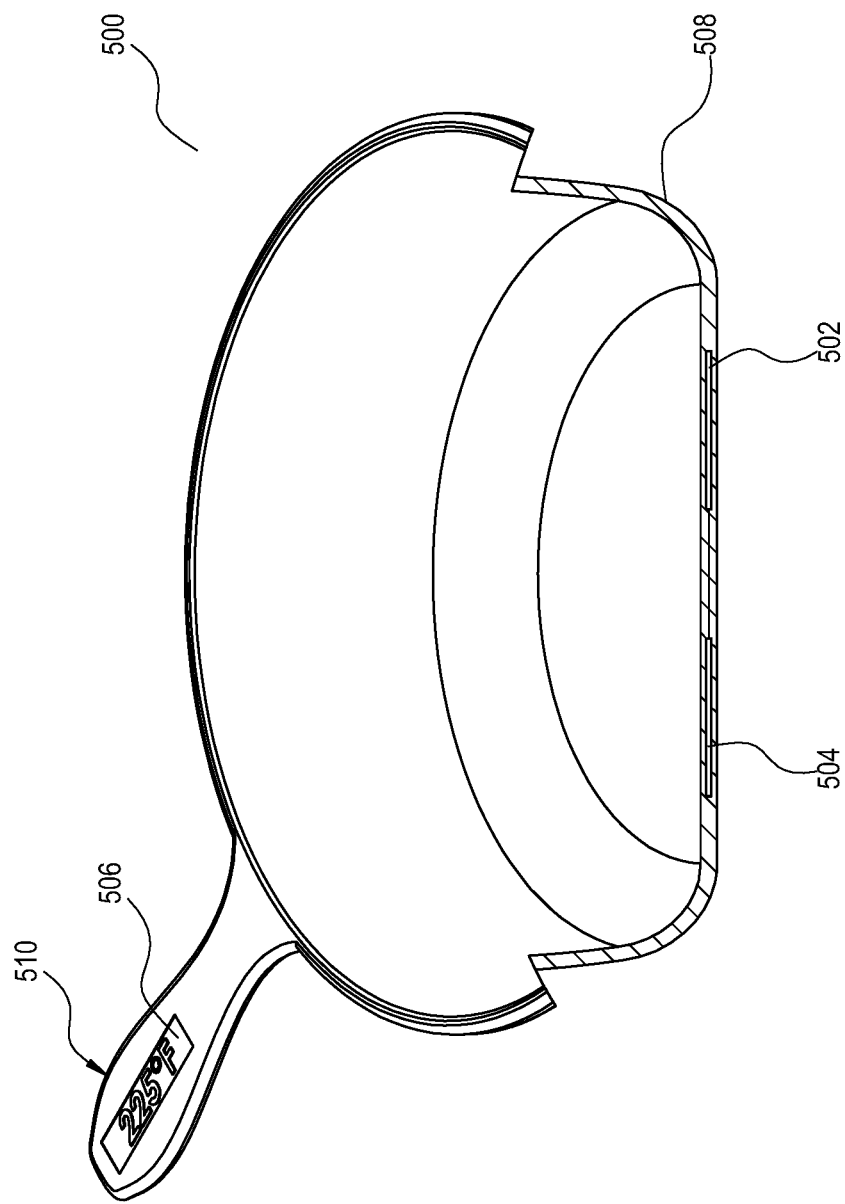
FIG. 5 illustrates an example of a cooking device with an embedded temperature gauge.

FIG. 5 illustrates a cross sectional view of a cooking device 500. The device 500 includes a bottom 508 and a handle 510. In this example, a thermoelectric generator 502 and a temperature gauge 504 are embedded in layers of the cooking device 500. In other words, the cooking device 500 may be formed from multiple layers and may be have a laminate structure. In this example, the thermoelectric generator 502 and the temperature gauge 504 may be included or formed as one of the layers. Thus, the thermoelectric generator 502 and the temperature gauge 504 may be embedded in the body of the cooking device 500.

The cooking device 500 may also include a display 506 that is capable of being powered by the thermoelectric generator 502. The temperature determined from the temperature gauge 504 may be displayed in the display 506. The display 506 may also be embedded in the handle 510. The display 506 could be placed on another location of the body of the cooking device 500.

Figure 6:
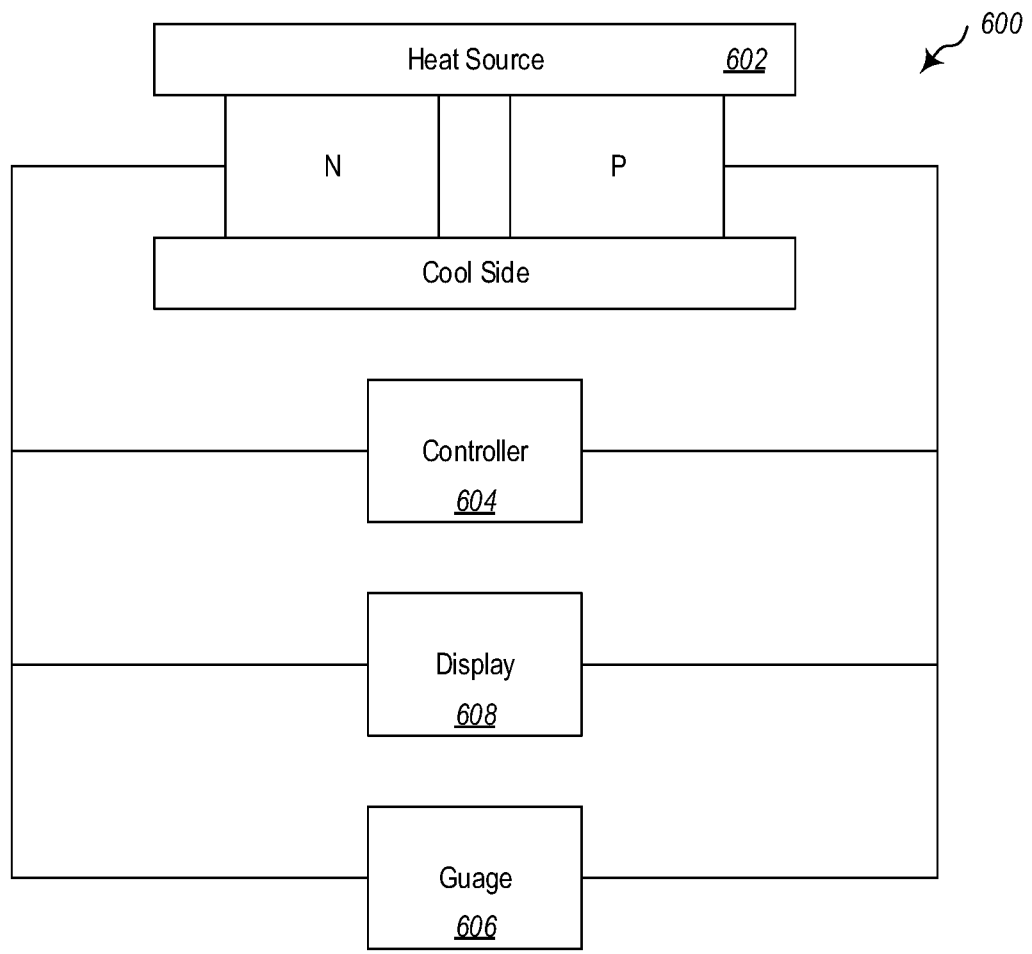
FIG. 6 illustrates a block diagram of a thermoelectric generator, a temperature gauge and/or a display that is incorporated into a cooking device or into a liner shell.

FIG. 6 illustrates an example of a temperature system 600 that may be embedded or included in a cooking device, in a liner shell, or distributed between the cooking device and the liner shell. A thermoelectric generator 602 may include a hot side (contacting the heat source used to heat the cooking device) and a cool side (further away from the heat source) on the other side. Semiconductor materials (e.g., n and p materials) are arranged between the hot side and the cool side. The heat differential may generate current that can be used to power a controller 604, a temperature gauge, 606, and/or a display 608.

Figure 7:
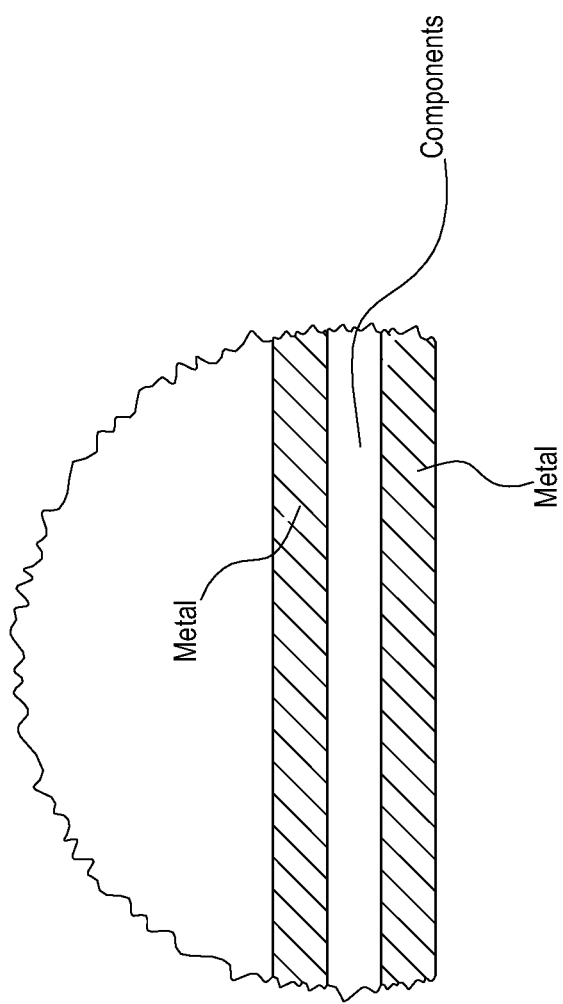
FIG. 7 illustrates an example of a layered cooking device that incorporates a temperature system.

FIG. 7 illustrates a laminate structure of a cooking device. The temperature system 600 of FIG. 6, for example, may be formed in one of the layers of the cooking device. Metal layers may be on both sides of the components. The components, however, may not be in electrical contact with components of the temperature system.

The concepts and features described herein may be embodied in other specific forms without departing from their spirit or descriptive characteristics. The described embodiments are to be considered in all respects only as illustrative and not restrictive. All changes which come within the meaning and range of equivalency of the claims are to be embraced within their scope.

We claim:

1. A high-temperature liner, comprising the following:
   a liner shell configured for placement within a cavity of a cooking device, the liner shell providing a liner cavity that is complementary to and approximates a shape of the cavity, the liner shell contacting an entirety of an inner surface of the cavity of the cooking device, the liner shell comprising a cooking device receiving cavity configured to receive at least a portion of an edge of the cooking device, the shell liner being configured to lie directly on an interior cavity surface of the cooking device;

a bottom plate at least partially embedded within the liner shell; and a temperature gauge configured to provide internal temperature readings for the cooking device.

2. The high-temperature liner of claim 1, wherein the liner shell is made of silicone or graphene.

3. The high-temperature liner of claim 1, wherein the liner shell is attached to or is part of the cooking device.

4. The high-temperature liner of claim 1, wherein the cooking device is a cast iron cooking device.

5. The high-temperature liner of claim 1, wherein the liner shell further includes a thermoelectric generator.

6. The high-temperature liner of claim 5, wherein the thermoelectric generator is embedded between two layers of the liner shell, and is configured to power a transceiver that connects to a computing device to provide electronic temperature readings.

7. The high-temperature liner of claim 6, wherein the transceiver transmits the electronic temperature readings via a wired or wireless connection to the computing device.

8. The high-temperature liner of claim 5, wherein the thermoelectric generator is formed with the two layers of the liner shell, and is configured to power a transceiver that connects to a computing device to provide electronic temperature readings.

9. The high-temperature liner of claim 1, wherein the temperature gauge is a solid state temperature gauge.

10. The high-temperature liner of claim 1, wherein the temperature gauge provides an indication of a temperature of a cooking surface of the cooking device and/or a temperature of an interior space of the cooking device.

11. The high-temperature liner of claim 1, further comprising a gripping portion configured to contact an outer surface of the cooking device when the lip overlaps the edge of the cooking device.

12. The high-temperature liner of claim 1, wherein the bottom plate is selectively removable from the liner shell.

13. The high-temperature liner of claim 1, wherein the bottom plate is entirely embedded within the liner shell.

14. The high-temperature liner of claim 1, wherein liner shell is a form-fit liner shell configured to lie directly on the interior cavity surface.

15. The high-temperature line of claim 1, wherein the thermoelectric generator is cast within layers of the liner shell.

16. A cooking device comprising:
a body having a cavity adapted for cooking and a cavity-forming structure; and of a temperature gauge and a thermoelectric generator embedded in the cavity forming structure so that a mass of a base of the cavity-forming structure surrounds and encloses the temperature gauge and the thermoelectric generator, in cross-section of the base of the cavity-forming structure the cavity-forming structure that is adjacent and extending from both a cavity side and a non-cavity side of the temperature gauge and the thermoelectric generator being monolithic,
wherein the base of the cavity-forming structure including the temperature gauge and the thermoelectric generator has a plurality of layers when viewed in cross-section, the plurality of layers being stacked vertically.

17. The cooking device of claim 16, further comprising a display incorporated into a portion of the body, wherein the thermoelectric generator generates current used to power the temperature gauge and used to power the display, wherein data from the temperature gauge is displayed in the display.

18. The cooking device of claim 17, wherein the display is integrated into a handle or an exterior side of the body.

19. A high-temperature liner, comprising the following:
a liner shell configured for placement within a cavity of a cooking device, the liner shell providing a liner cavity that is complementary to the cavity, the liner shell contacting substantially an entirety of an inner surface of the cavity of the cooking device, the liner shell comprising a cooking device receiving cavity configured to receive at least a portion of an edge of the cooking device, the shell liner being configured to lie directly on an interior cavity surface of the cooking device;

a bottom plate at least partially embedded within the liner shell; and a temperature gauge configured to provide internal temperature readings for the cooking device, wherein the liner shell further includes a thermoelectric: generator, and wherein the thermoelectric generator is formed with the two layers of the liner shell, and is configured to power a transceiver that connects to a computing device to provide electronic temperature readings.

\* \* \* \* \*